(12) United States Patent
Colucci

(10) Patent No.: US 10,984,488 B1
(45) Date of Patent: Apr. 20, 2021

(54) PREDICTIVE COMPATIBILITY MATCHING PLATFORM

(71) Applicant: Michele Colucci, Redwood City, CA (US)

(72) Inventor: Michele Colucci, Redwood City, CA (US)

( * ) Notice: Subject to any disclaimer, the term of this patent is extended or adjusted under 35 U.S.C. 154(b) by 323 days.

(21) Appl. No.: 15/960,369

(22) Filed: Apr. 23, 2018

Related U.S. Application Data

(60) Provisional application No. 62/489,390, filed on Apr. 24, 2017, provisional application No. 62/521,087, filed on Jun. 16, 2017.

(51) Int. Cl.
| | |
|---|---|
| *G06Q 10/10* | (2012.01) |
| *G06Q 10/06* | (2012.01) |
| *G06Q 30/02* | (2012.01) |
| *G06Q 40/02* | (2012.01) |
| *G06Q 50/00* | (2012.01) |
| *G06F 16/9535* | (2019.01) |

(52) U.S. Cl.
CPC ......... *G06Q 50/01* (2013.01); *G06F 16/9535* (2019.01)

(58) Field of Classification Search
CPC ............................ G06Q 50/01; G06F 16/9535
USPC .......................................... 705/1.1–912, 319
See application file for complete search history.

(56) References Cited

U.S. PATENT DOCUMENTS

| | | | |
|---|---|---|---|
| 5,875,431 A | 2/1999 | Heckman et al. | |
| 7,277,888 B2 * | 10/2007 | Gelormine | G06Q 30/02 |
| 8,010,556 B2 * | 8/2011 | Terrill | G06Q 30/08 |
| | | | 707/770 |
| 8,498,945 B1 | 7/2013 | Remington et al. | |
| 8,954,343 B2 * | 2/2015 | Wright | G06Q 30/02 |
| | | | 705/7.29 |
| 2004/0128148 A1 * | 7/2004 | Austin | G06Q 30/02 |
| | | | 705/319 |
| 2005/0177614 A1 * | 8/2005 | Bourne | H04L 51/38 |
| | | | 709/200 |
| 2006/0059130 A1 * | 3/2006 | Weiss | G06F 16/951 |
| 2006/0136498 A1 * | 6/2006 | Insley | G06Q 10/00 |
| 2006/0229999 A1 | 10/2006 | Dodell et al. | |
| 2007/0073803 A1 * | 3/2007 | Terrill | G06Q 50/22 |
| | | | 709/203 |
| 2012/0226701 A1 * | 9/2012 | Singh | G06F 21/40 |
| | | | 707/748 |
| 2013/0035912 A1 * | 2/2013 | Margines | G06N 7/00 |
| | | | 703/2 |
| 2013/0297540 A1 | 11/2013 | Hickok | |
| 2015/0113067 A1 * | 4/2015 | Taylor | H04L 51/04 |
| | | | 709/204 |

(Continued)

OTHER PUBLICATIONS

Cappello, Nile, "Dining Apps That Set Up You to Eat With Strangers," www.huffpost.com, HuffPost Life, Oct. 1, 2013. (Year: 2013).*

(Continued)

*Primary Examiner* — Jonathan P Ouellette
(74) *Attorney, Agent, or Firm* — Perkins Coie LLP

(57) ABSTRACT

A variety of improved methods and systems for a connection compatibility matching platform using machine learning. Machine learning algorithms and artificial intelligence can analyze information about users from a plurality of sources, determine important factors and dynamically adjust the weights of the information received to provide accurate compatibility matches.

18 Claims, 9 Drawing Sheets

(56) References Cited

U.S. PATENT DOCUMENTS

| | | | |
|---|---|---|---|
| 2015/0127638 A1* | 5/2015 | Parks | G06F 16/9537 |
| | | | 707/723 |
| 2015/0150100 A1* | 5/2015 | Soni | G06F 16/958 |
| | | | 726/7 |
| 2019/0197442 A1 | 6/2019 | Lu | |

OTHER PUBLICATIONS

Ashley, Kevin D., et al., "Automatically Classifying Case Texts and Predicting Outcomes", https://link.springer.com/article/10.1007/s10506-009-9077-9, Jul. 9, 2009, pp. 125-165.

Berman, Donald H., et al., "The Potential of Artificial Intelligence to Help Solve the Crisis in Our Legal System", Communications of the ACM, vol. 32, No. 8, Aug. 1989, pp. 928-837.

McGinnis, John O., et al., "The Great Disruption: How Machine Intelligence Will Transform the Role of Lawyers in the Delivery of Legal Services", Fordham Law Review, vol. 82, Issue 6, Article 16, 2014, pp. 3041-3066.

* cited by examiner

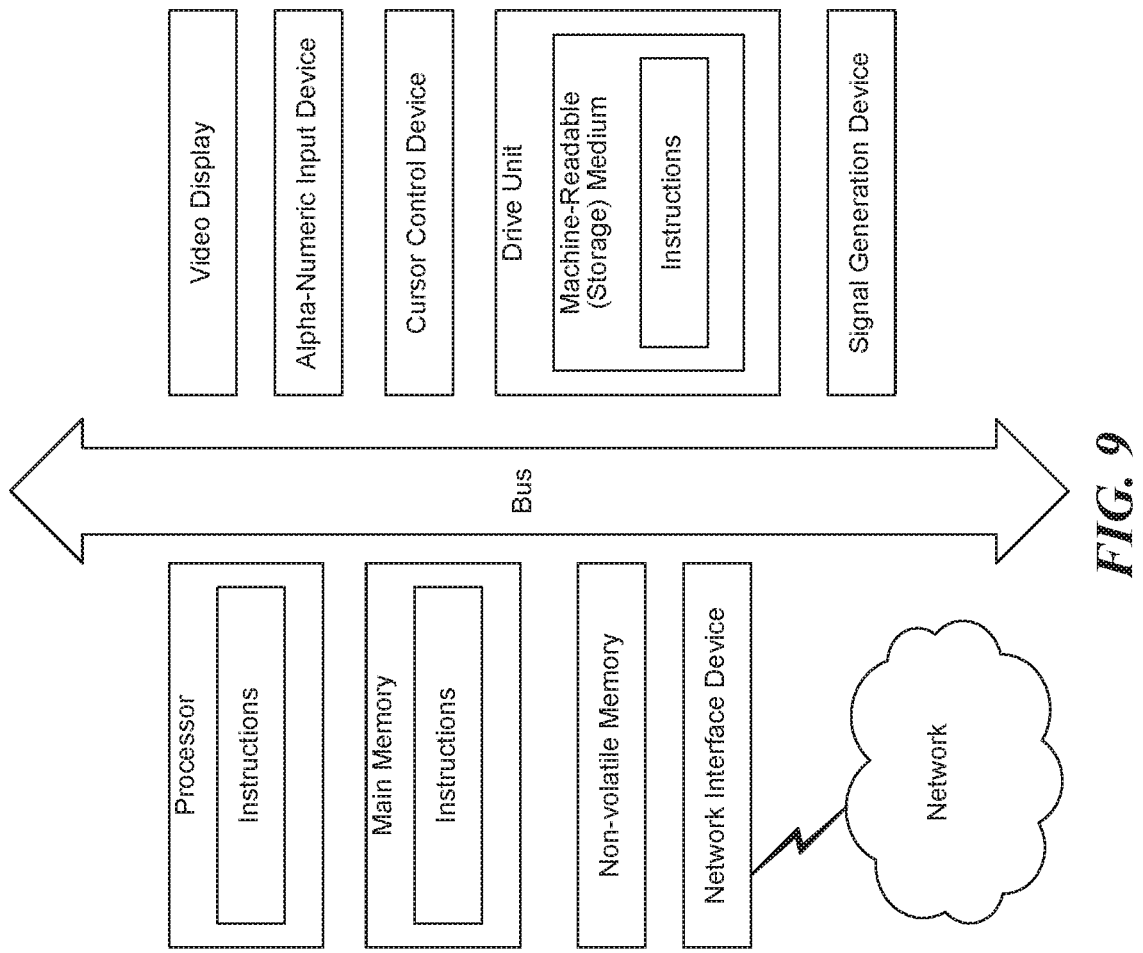

US 10,984,488 B1

PREDICTIVE COMPATIBILITY MATCHING PLATFORM

CLAIM FOR PRIORITY

This application claims priority to U.S. Provisional Patent Application No. 62/489,390, entitled "MeetandEat," By Colucci, and filed on Apr. 24, 2017. This application also claims priority to U.S. Provisional Patent Application No. 62/521,087, entitled "MeetandEat," By Colucci, and filed on Jun. 16, 2017. The content of the above-identified applications are incorporated herein by reference in their entirety.

TECHNICAL FIELD

The present disclosure contemplates a variety of improved methods and systems for analyzing people and their characteristics and then predicts compatibility between the people.

BRIEF DESCRIPTION OF THE DRAWINGS

A method, system and apparatus for predicting compatibility between people. The objects, features, and characteristics of the technique introduced here will become more apparent to those skilled in the art from a study of the following detailed description in conjunction with the appended claims and drawings, all of which form a part of this specification. In the drawings:

FIG. 6 illustrates an embodiment of the user profile graphic user interface;

FIG. 7 illustrates an embodiment of the user profile graphic user interface;

FIG. 8 illustrates a view of an event calendar; and

FIG. 9 illustrates an embodiment of a computer system.

DETAILED DESCRIPTION

Figure 1:
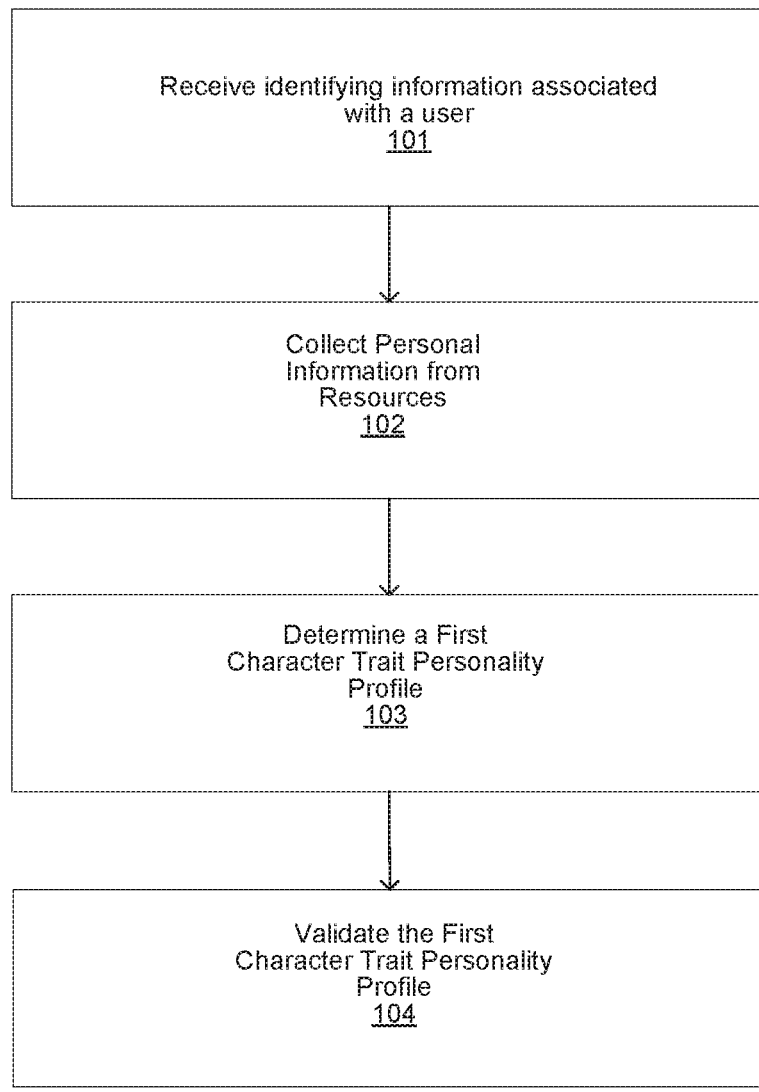
FIG. 1 illustrates an embodiment of relationship profile determination and validation.

Some of the examples described herein include connecting people based on a predicted compatibility among the people. For example, someone might want to be connected with a person for a professional reason (e.g., to find sales leads, engage in professional networking, etc.). Someone else might want to be connected with someone else for a personal reason (e.g., for dating, finding a babysitter, finding a cleaning person for their home, etc.).

There is often very little information about the person with whom the person is connecting with. People can use dating websites or apps for romantic connections, short-term rental websites or apps for connections to people subletting their living space, service websites or apps that connect people to others who will perform certain tasks for them, nanny connection services, bank loan services that help individuals find funding for various things in venues from traditional banking to crowdsourced funding, and more. However, the information for these potential connections might be limited to a name, city, age, work experience, etc. Many users looking for connections might want more insight into additional characteristics of potential connections.

The objective elements of the identity of the person and their personality characteristics play an important role in the user's willingness to follow through and make the connection. Many people don't use these services (e.g., websites or apps as discussed above) due to the lack of this information being provided, or due to low quality of the information. While certain objective qualities of a person can be verified, many cannot and subjective characteristics are primarily just self-reported and as such potentially flawed. The system and techniques described herein seek to pull back the curtain to identify, through first person, third party and objective data sources, the quality of the person to whom the connection is being made—specifically the qualities relevant to the particular transaction contemplated by the parties. Thus, objective and subjective information regarding a potential connection can be provided such that the user can make a more informed decision regarding initiating contact.

Some of the examples herein are described in the context of online dating. However, these techniques can be implemented in other contexts and industries. For example, the techniques described can be implemented for lending (e.g., to identify whether a person is a good candidate to provide a personal loan), professional or social networking, etc.

Online dating is a modern dating trend. There are millions of singles online at any given time. Online dating users are overloaded with information and are not provided tools to identify compatible romantic partners. The disclosure technique describes a method of leveraging artificial intelligence and machine learning to provide its users with compatible matching partners. The technique also includes a matchmaking module which incentivizes matchmakers to take a proactive approach to helping singles.

FIG. 1 illustrates an embodiment of relationship profile determination and validation. At step 101 identifying information associated with the user is received. Identifying information can include the user's name, social media profile information, birth date, or employment information.

In at least some embodiments prior to collecting the personal information about the user, electronic resources can be identified from which to collect personal information. For example, it can be determined that electronic resources from which to collect information include social media websites, criminal records databases, or news articles. Determination as to which electronic resources to use can be determined based on identifying information provided by the user, for example, if the only available information about the user includes user's name and social media profile where the social media profile does not include the user's age or location then it could be determined that certain electronic resources are not suitable as resources because the level of accuracy of collected information would be low. In some embodiments, the commonness of the user's name can factor into which resources to use. For example, if a user's name is particularly uncommon then it can be determined that all available electronic resources would yield accurate results if searched. If the user's name is common, then the consistency of that name in multiple resources can provide an assurance as to accurate results.

At step 102 identifying information can be used to collect personal information about the user. In at least some embodiments the personal information is collected from the identified electronic resources. Personal information collected in this way can include, but is not limited to, photographs, social media posts, professional articles, news articles, demographic information, criminal history, and/or other documents written about or by the user. At step 103, the personal information collected can be analyzed to extract a character trait personality profile. In some embodiments, the character trait personality profile can include physical traits of the person. The physical traits can include the user's hair colors, hair length, skin color, eye color, height, and/or weight. In some embodiments, the character trait personality profile can analyze people found in pictures of the user to determine the physical traits which the user finds attractive. For example, if the user is a straight male who consistently appears in photographs with women with short hair it can be determined that the user finds women with short hair attractive. Thus, characteristics, interests, physical traits, personality traits, etc. of the user can be identified based on the personal information collected from the data sources, for example, by analyzing pictures.

In at least one embodiment the determination of the character traits which the user finds attractive is only performed on a threshold number of photographs and threshold number of people in photographs are identified. For example, the threshold number can be set to ten photographs and twenty people. In this example, if only nine photographs are available in association with the user (e.g., photos depicting the user) then those photographs would not be analyzed to determine the features which the user finds attractive because that sample size does not meet the threshold number of ten. Furthermore, in some embodiments a threshold number is set to the number of people that appear in a photograph. For example, in some embodiments photographs not including more than three people are not analyzed to determine the character traits which the user finds attractive. In some embodiments, the threshold number can be set based on characteristics of the user. For example, older users might have fewer photographs online than younger users who might be more social media savvy. Thus, if an older user (e.g., sixty or older) has nine photographs collected from the resources (i.e., one photo below the threshold number of ten photographs) then the photographs can be analyzed to determine the various characteristics (or interests, traits, etc.) of the user. However, if a twenty-year-old has only nine photographs, then those photographs might not be analyzed. In some embodiments, the source of the photographs can also be considered. For example, users can upload photographs and third parties (e.g., friends of the user) can upload other photographs. Photographs provided by third parties can be considered to be more reliable than photographs provided by the user. Thus, the photographs provided by the third-parties can be considered to provide more objective information such as the character traits which the user finds attractive.

This type of data can be objective data because it can represent factual information such as a person's height, hair color, hair length, etc. As discussed below, other type of identifying information can be collected from third parties. The type of information collected from third parties (e.g., via crowd-sourcing via social networks) can be subjective data because it can represent opinions regarding characteristics of a person such as honesty, humor, etc. The opinions can vary from person-to-person. Moreover, the subjective data provided via third parties can be more "objective" because many third parties all providing the same information can suggest that the subjective data is factual information.

In addition to the personal information that can be analyzed to determine the objective information about the user, subjective information such as maturity level, openness, honesty, integrity, independence, empathy, action, professional ambition, athleticism, conflict resolution style, introversion level, extroversion level and/or generosity, can also be received or determined. In some embodiments, the user might provide some of this information. For example, the user might indicate a level of maturity, athleticism, ambition, whether he or she is an extrovert or introvert, etc.

Additionally, this subjective information can be validated by third-parties via crowdsourcing from a community. That is, the subjective information can be confirmed as being relatively accurate by the third-parties (e.g., from their perspectives or from their experiences from interacting with the person). For example, in step 104 the first character trait personality profile is validated. Validation can include requesting feedback from third-parties such as social media friends, people who might have encountered the user in daily life (e.g., people who live in the same neighborhood, people who attend the same establishments such as gyms, attending the same university, employed in the same office, etc. as indicated via social graphing), and/or selected references to provide more insight into subjective characteristics of the user. For example, a user can be asked to provide a few references. The references can be provided with the determined character profile. Additionally, the references can be prompted to identify whether the determined character traits are correct. For example, the user can provide contact information (e.g., email, phone number, mailing address, etc.) for the references or the contact information for the references can be identified using the resources used to collect personal information of the user. In at least some embodiments the references can be asked to answer questions about the user and based on the responses the character trait personality profile can be updated, for example, by providing more insight into subjective information regarding the user. The answers provided by the references can be weighted higher and/or lower than the collected personal information. For example, if the user indicates that they are an introvert (which can be a subjective interpretation of one's own personality or social interactions), but a majority of the references from the third parties indicate that the user is an extrovert, then the validation can include indicating that the user is actually an extrovert rather than an introvert. Thus, the third party information can be used to validate that the user's provided information was incorrect. Additionally, the third parties can provide information regarding the user's character traits. Thus, in one example, a user filling out a profile might not provide information indicating whether the user is honest. Information regarding the honesty of that user can be provided by the third parties. In some embodiments, subjective information can be used to determine negative character traits and the objective information can be used to determine positive character traits.

In some embodiments, the weight of the references versus collected information can be determined based on the volume of information available. For example, if very little personal information is collected then that little personal information can have a lower weight than information collected from the references. Alternatively, if a threshold amount (e.g., ten social media posts, six total sources, eight total documents) of personal information is collected then it can be given a higher weight than the information collected from the references in identifying the first character trait personality profile.

In at least one embodiment, validating the first character trait profile can include validating that the person is single, and/or other information provided (e.g., age, recent photos, profession) is correct. In some embodiments, only the subjective information regarding the person is validated. Objective information can be assumed to be correct.

In another example of validation, members of a person's community can be contacted to provide some form of validation regarding subjective characteristics of a person. If a threshold number of responses from third parties indicates that a person has some characteristics (e.g., that the person is honest), then the person can be validated as being an honest person. This results in the person's character trait personality profile to be updated to reflect that the characteristic is true for that person. In some embodiments, if there are conflicting responses from third parties, then the response most provided can be selected as the validated characteristics (e.g., five people indicated that the person being reviewed is honest while three people indicated that person is dishonest).

In another embodiment, the responses from third parties more similar to the user can be used to validate the subjective characteristic. For example, if the user seeking another person to be connected with (whether for a romantic match, professional networking, etc.) is in his or her thirties, then responses from third parties who are also in their thirties might be prioritized (or weighted) to be emphasized more than responses from those not in their thirties. For example, if ten responses from third parties in their thirties indicate that the person is honest and ten response from third parties not in their thirties indicate that the person is dishonest, then the person can be validated as being honest for the user. In another embodiment, third parties that know the person in a personal capacity (e.g., contacted via a personal social network) can be prioritized over third parties that know the person in a professional capacity (e.g., contacted via a professional business social network). This results in the responses from third parties in the personal capacity to be used for validation if there is a conflict from the responses from the third parties from third parties in the professional capacity. In some embodiments, how long the third party has known the user seeking another person to be connected with can be used to emphasize that third party over another third party. For example, a third party knowing the user longer (e.g., in real life, on an online social network, etc.) might have their responses more emphasized. The amount of contact between the third party and the user can also be used to emphasize responses.

Figure 2:
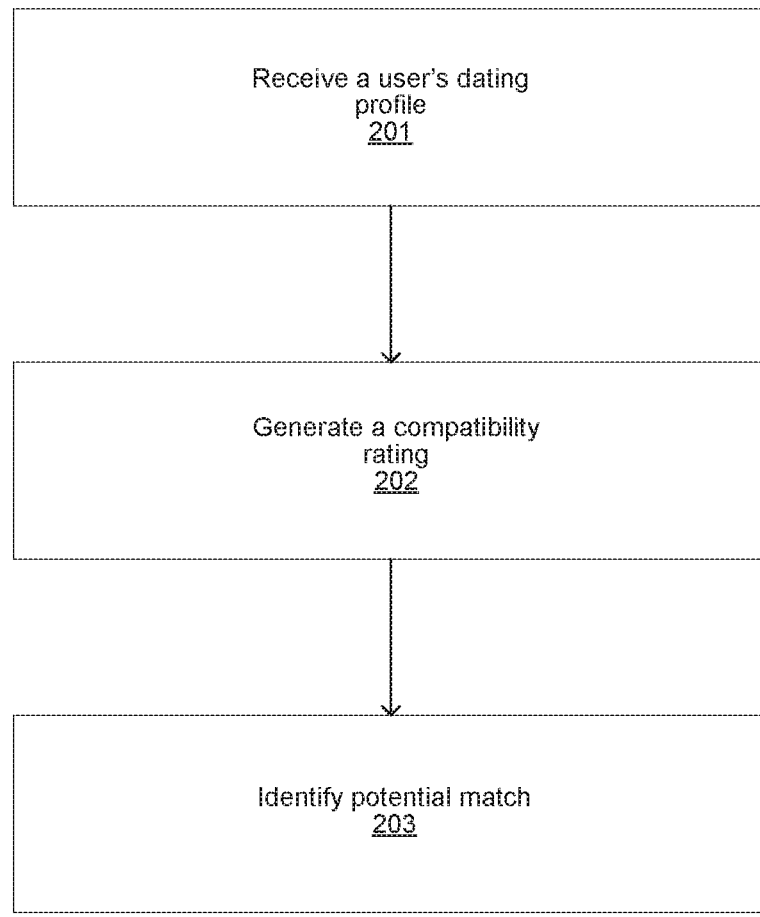
FIG. 2 illustrates an embodiment of profile matching.

FIG. 2 illustrates an embodiment of profile matching. At step 201 a user's dating profile is identified. The user dating profile can include the first character trait personality profile. Using the first character trait personality profile associated with the dating profile, a potential compatible partner can be identified. In some embodiments, these profiles are prefiltered according to the user criteria such as location, gender, and age. In some embodiments, the prefiltering includes the user criteria and the criteria of the user profile. For example, if Tom is a 32-year-old male whose user criteria is a single, woman, age 28-36, then Sandy who is a 34-year-old single woman looking for a single man age 34-40 will be filtered out at step 201 because although Sandy fulfills Tom's user criteria, Tom does not fulfil Sandy's user criteria. In some embodiments, the location and age of the user can be determined and used to provide an age range. Thus, users in different locations might have different age ranges. As another example, user criteria can indicate characteristics of people that are subjective, for example, those that are collected via the third-party crowdsourced technique describe above. In an example, a user can indicate in their user criteria subjective characteristics such as nice, honest, great sense of humor, stable, loves kids, etc.

The first character trait personality profile can be compared against other character trait personality profiles to determine a compatibility rating at step 202. In at least one embodiment they can be compared using a predictive model, the predictive model can determine the compatibility of the individuals. For example, the collected personal information can indicate preferences of food, restaurants, music, etc. that reveal inner traits which also provide matches of compatibility. For example, if two people love a particular song or a band, they might have similarities in perspective (from the lyrics), in personality characteristics such as temperament (from the pace/tone of the music), from generation or appreciation of the generation, and from a whole host of other factors which make them compatible. In another example, for restaurant tastes, if two people like the same restaurant, that will reflect a lot about the fact that they like more intimate experiences, they appreciate sophisticated food, they like fine American cuisine, they live close, they have a certain socio-economic level because they have to be able to afford the meal at the restaurant, etc. As a result, the personal information collected as discussed in FIG. 1 can include collecting different answers to questions including interests such as favorite songs, bands, restaurants, etc. that can be used to provide more insight into character, temperament, education, sophistication, age, location, socio-economic status, or other objective and subjective characteristics or traits of the user.

Because not every user values compatibility of each trait equally, in some embodiments the user can be associated with a weight associated with individual traits. For example, it can be identified that the user finds a specific hair color and specific height to be important characteristics of the potential match, the specific height is more important to the user than the hair color. The weights associated with individual attraction traits can be dynamically updated based on feedback. In one embodiment, the weights can be based on search habits, for example, how the user is looking for a person to be connected with. In at least one embodiment, the associated weights with individual attraction traits can be initially set to a default value based on user answers. In some embodiments, the associated attraction weight can be initially set based on user answers, set by user, based on third-party provided information, and/or set by user demographic (e.g., gender, age, education level, location). The attraction trait weights can be associated with the user profile and/or character trait profile. Census information for successful marriages can also be another source.

In at least one embodiment, first the list of profiles to which a user attempts to identify compatibility are identified. The profiles can be identified using geographic location, physical traits, and other things such as age, socio economic brackets, whether the person has children, gender, etc. Furthermore, it can be determined whether a compatibility match was previously performed between the two users. In an example, Tina is only interested in straight single men ages 40-50. Only profiles identified as being associated with straight single men ages 40-50 are identified. Additionally, out of those identified profiles, only the profiles of users which were not previously analyzed for compatibility with Tina can be analyzed for compatibility. However, if any changes were made to a user profile based upon new personal information collected such as third party information received after the previous analysis for compatibility, then the users associated with those profiles can be included. As previously mentioned, census information for successful marriages can also be another source.

At step 203, based on the compatibility rating, potential romantic matches are identified. In some embodiments, the compatibility ratings can be provided when the compatibility score is above a threshold amount (e.g., 80%). Thus, the 80% threshold amount can be a threshold criterion for a degree of romantic match compatibility in the scenario of dating.

Figure 3:
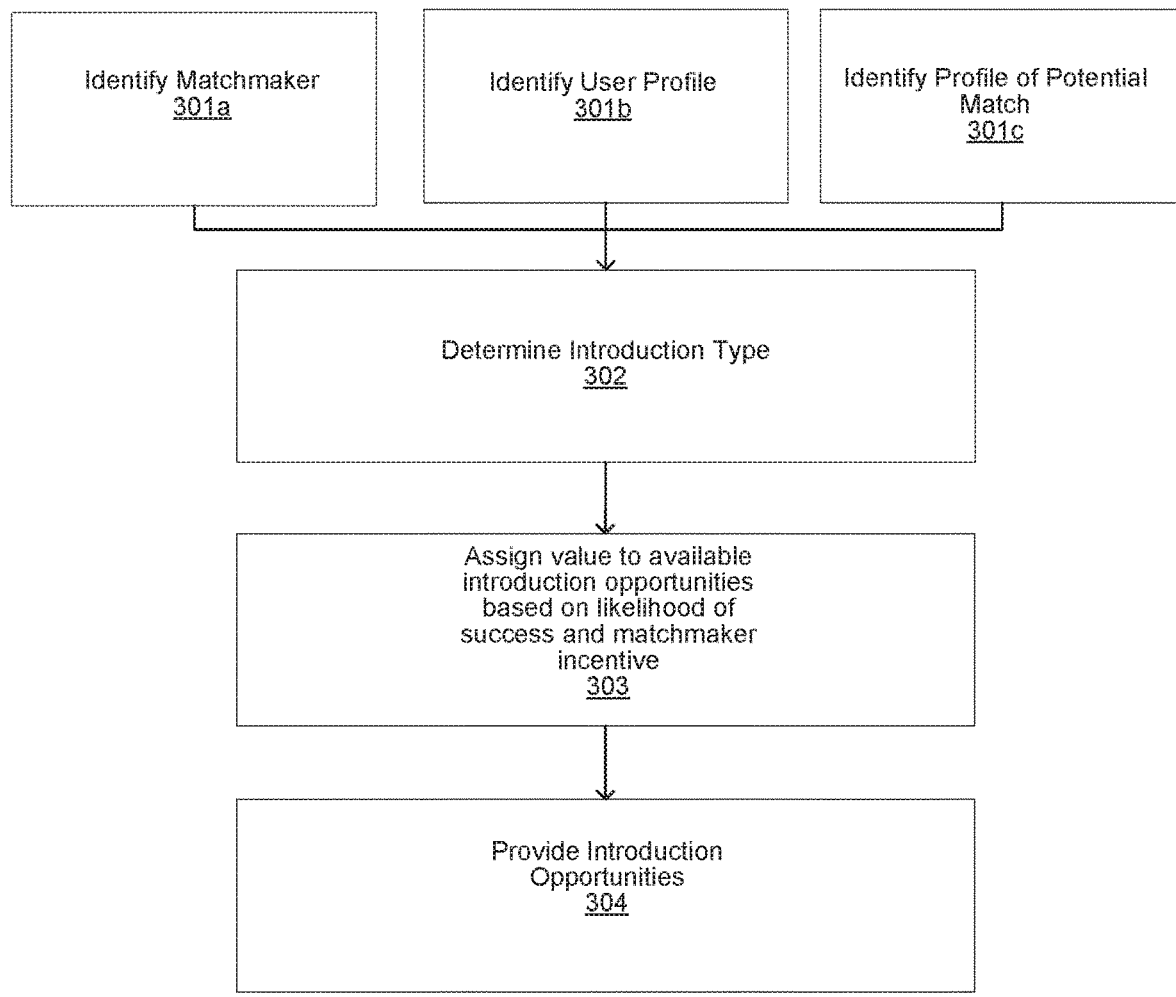
FIG. 3 illustrates an embodiment of the introduction determination.

FIG. 3. illustrates an embodiment of the introduction determination process. At step 301a, a matchmaker is identified. A matchmaker can be a friend, an acquaintance, and/or a person and/or agency that informally or formally arranges relationships between others. At step 301b a user profile is identified. The user profile can be associated with a character trait profile, a character trait profile, and/or an attraction trait weight profile. At step 301c user profiles of potential matches are identified. In at least one embodiment, the identified potential match is the identified potential match of step 203.

At step 302 introduction type can be determined. For example, it can be determined that the two people would be best introduced in a one-on-one setting such as a coffee date, or a hike. It can also be determined that the two people are best introduced in a group setting for example a happy hour with other singles. User characteristics can be used to identify the type of setting and the duration that is best for the introduction. For example, an introverted user can be determined to be a better candidate for a one-on-one date, while an extroverted user can best be determined to be a better candidate for a group date. Furthermore, the degree of compatibility can factor into whether the introduction type should be one-on-one. For example, if the degree of compatibility is very high then it can be determined that a longer date (e.g., more than an hour) is preferable. Other characteristics which can help determine the introduction type can include the user's geographic location, socioeconomic level, and/or age can factor into the type of ideal setting which is the community standard. For example, if shorter dates are standard in a specific geographic area like New York it is a factor in determining whether to provide a shorter date as the introductory type. Alternatively, if longer dates are standard in the specific geographic area for all New Mexico, then that could be a factor in determining whether that introductory setting should include a shorter date. Furthermore, the geographic distance between the potential romantic partners can be factored into the introduction type. For example, a long (e.g., over 60 miles) geographic distance can factor into determining that the introduction setting should be a longer one on one date, while a very long (e.g., over 200 miles) can factor into suggestion the potential couple meet telephonically. Characteristics to be used to determine the introductory setting can include personality type, user hobbies, user habits, the geographic location, age, and/or socioeconomic level. In some embodiments, common characteristics can be identified and provided as something common to discuss. This can result in a "blind" date to be a more comfortable experience. Hints regarding other common characteristics can also be provided so that the users can try to discover more about each other.

At step 303, an introduction opportunity can be determined based on data available on introduction opportunities in the determined introduction type. Furthermore, the introduction opportunity can include matchmaker incentives. For example, if two restaurants are determined to be the venue for a potential introduction, the matchmaker commission from sending a couple to a restaurant can be factored into determining whether to provide said restaurant date to the users as an introduction opportunity. If a determination is made that the introduction type is ideally a group date then the characteristics of the other users attending the group date are taken into account. For example, if the average age of the group date is 40, then individuals outside the threshold range (e.g., plus or minus 8 years) of 40 would not be assigned to the date.

Factors in determining the introduction opportunity can include the introduction type, matchmaker incentives, and/or user characteristics of both users (e.g., personality profiles, socioeconomic level, age, hobbies, dietary preferences, geographic data). At step 304 the introduction opportunity can be presented to the user. Matchmakers can be a friend setting up another friend, a professional matchmaker who brings clients to the service, and a person who wants to become a matchmaker.

In some embodiments, the matchmaker can be provided with an award for assisting with or initiating the introduction opportunity. For example, a financial reward, reward points that can be redeemed for prizes, or other types of awards can be accumulated as users play a matchmaker. That is, if two other people are successfully connected together (e.g., for a date, for a professional networking event, etc.) then the person who initiated the process to connect the two people together can be rewarded. This can allow for a situation for a parent's child to be a matchmaker, as well as a person's work colleagues, friends, etc. The matchmaker can thus be romantic-oriented (e.g. to find the person a date) or in line with any of the other examples such as professional networking.

Figure 4:
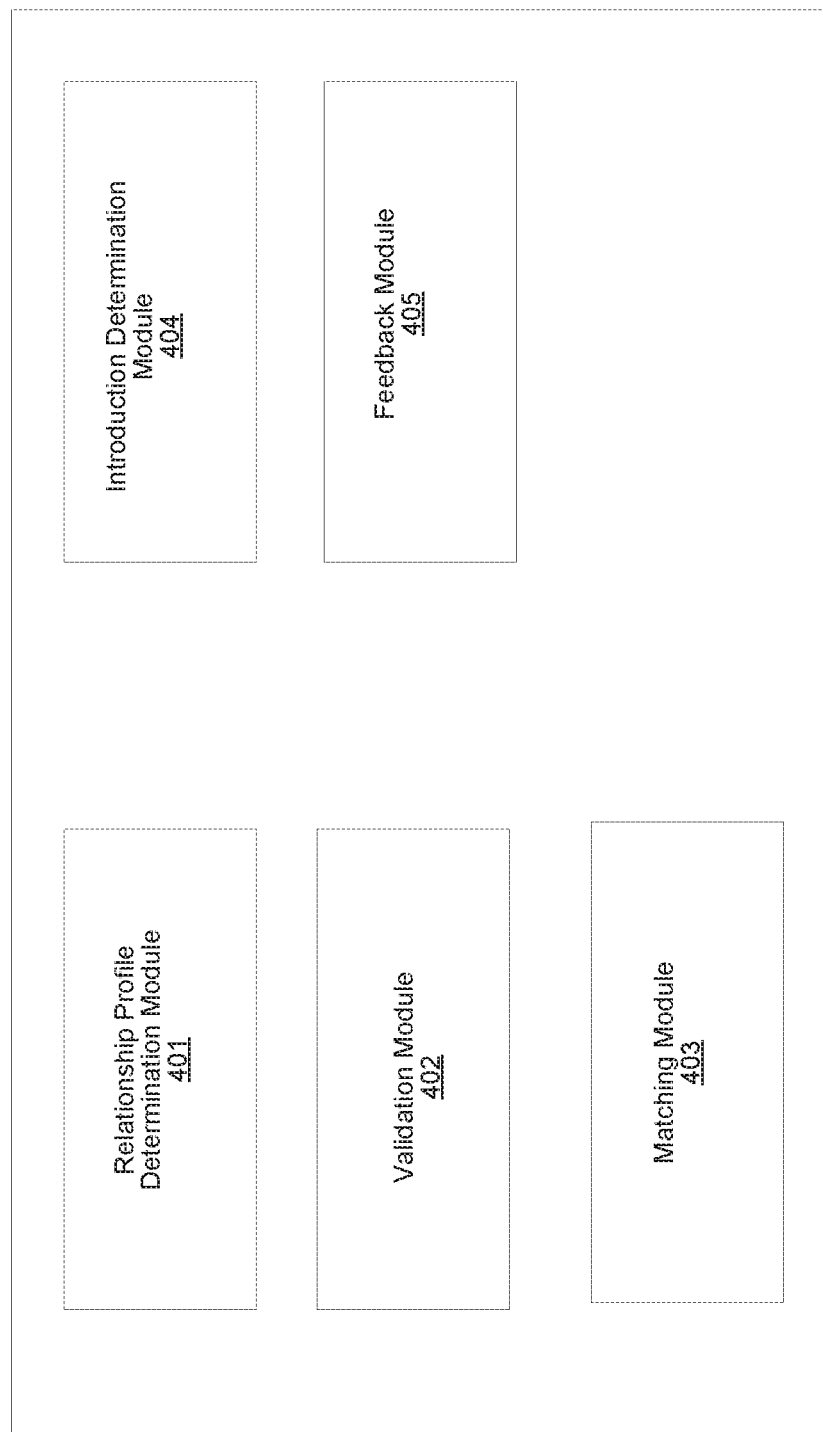
FIG. 4 illustrates modules of the predictive matching platform.

FIG. 4 illustrates modules of the predictive matching platform. Relationship profile determination module 401 can generate a user profile which can include an associated character trait profile, and/or attraction trait weights. The validation module 402 can validate information associated with first party input, input from potential matches that have met the user, and/or third parties such as friends, friends of friends, people in the system who have certain commonalities with the user and/or matchmakers. The matching module 403 can determine potential romantic partners for the user based on the user profile. The introduction determination module can suggest a date for the user and the romantic partner such as a restaurant date or the user can choose for themselves. In some embodiments, the introduction determination module provides the method for making a reservation for the date such as a restaurant reservation. The feedback module 405 can receive and analyze feedback then transmit the information to a relevant module. For example, if after two people go on a date, one of the people provides feedback that the other person is not the height that the profile indicated then this information can be transmitted to the relationship profile determination module. Thus, a feedback response can be received from someone after meeting a match and that feedback response can be indicative of how the person felt regarding being connected with the compatible romantic partner at the introduction setting (e.g., one-on-one at a coffee shop, etc.). Based on the feedback response, any of the variables described herein to determine a compatible match can be updated. For example, the threshold criterion can be updated, the character trait personality profile can be updated, etc. If the person felt that it was a good connection, then the variables can be updated to weight characteristics (either subjective or objective) of the other person more so for the person providing the feedback, or the threshold criterion can be lowered or raised, or the subjective or objective characteristics can be changed, removed, added, etc. By updating the threshold criterion, this can result in a change in a person's matches, for example, changes to the people being suggested for a possible match in the future, a change in the introduction setting can be introduced, etc.

Figure 5:
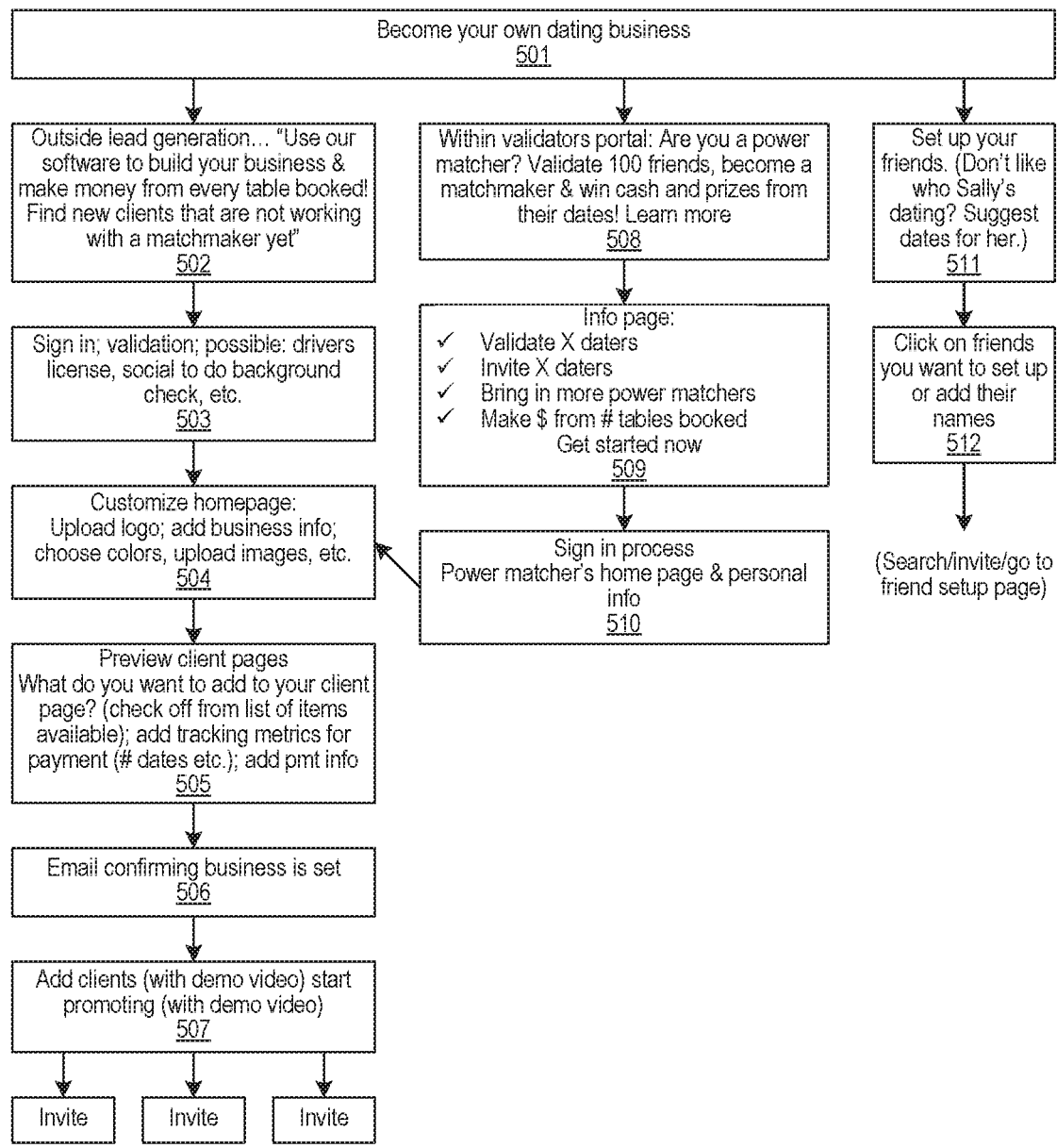
FIG. 5 illustrates an embodiment of the matchmaker process.

FIG. 5 illustrates an embodiment of the matchmaker process. At step 501, a user is provided with an option to become a matchmaker. At step 502, matchmaker is able to send and/or select users. The users can be individuals for whom the matchmaker intends to find a compatible match. Users are then provided with an option sign in and/or accept invitation in step 503. At step 504 the user's user profile can be generated. The matchmaker edited the user's age which is associated with user profile at step 505. At step 506 the user can be provided with communication that the matchmaker has edited the user profile and the user profile is now available for matching. At step 507 the user can be promoted to other users and/or invitations to dates can be sent to the user and/or the user's potential romantic partner. At step 508 validation can be performed. Validation can include matchmaker verifying that the information entered by the user is correct, and/or a friend(s) or third parties or a piece(s) of data verifying that the user profile is accurate. In some embodiments, the validation is performed after the date where both users or third parties can provide feedback about the accuracy of the other person's user profile. In some embodiments, a matchmaker is provided with an option to upgrade to a super matchmaker by inviting 100 friends to the matchmaking service 508. At steps 509 and 510 information can be provided to the match maker incentivizing the matchmaker to be more active in the matchmaking process and becoming a super matchmaker. At steps 511 and 512, the matchmaker can be provided with opportunities to setup users (e.g., clients, friends).

In some embodiments, matchmakers can be professionals looking for introductions for their clients. The matchmakers can provide contact information (e.g., email addresses) for their clients or the matchmakers can search for a potential match for one of their clients.

Figure 6:
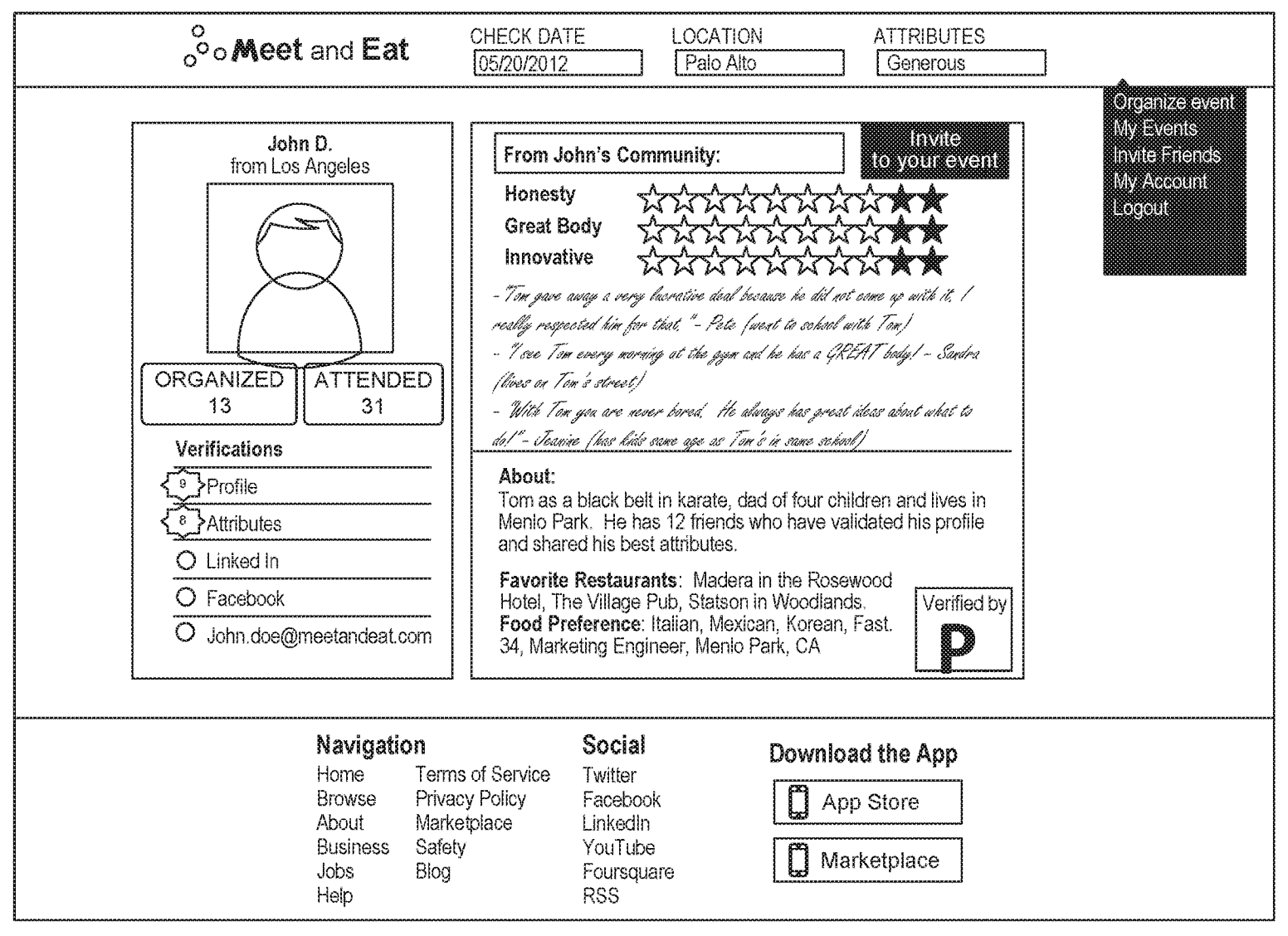

FIG. 6 illustrates an embodiment of the user profile graphic user interface (GUI). The user profile graphic user interface can include a picture, character traits (attributes), links to social media profiles, reviews, and other relevant information such as food or music preferences. The GUI depicted in FIG. 6 includes some information regarding a user's character traits including the subjective character traits that are sourced from third parties.

Figure 7:
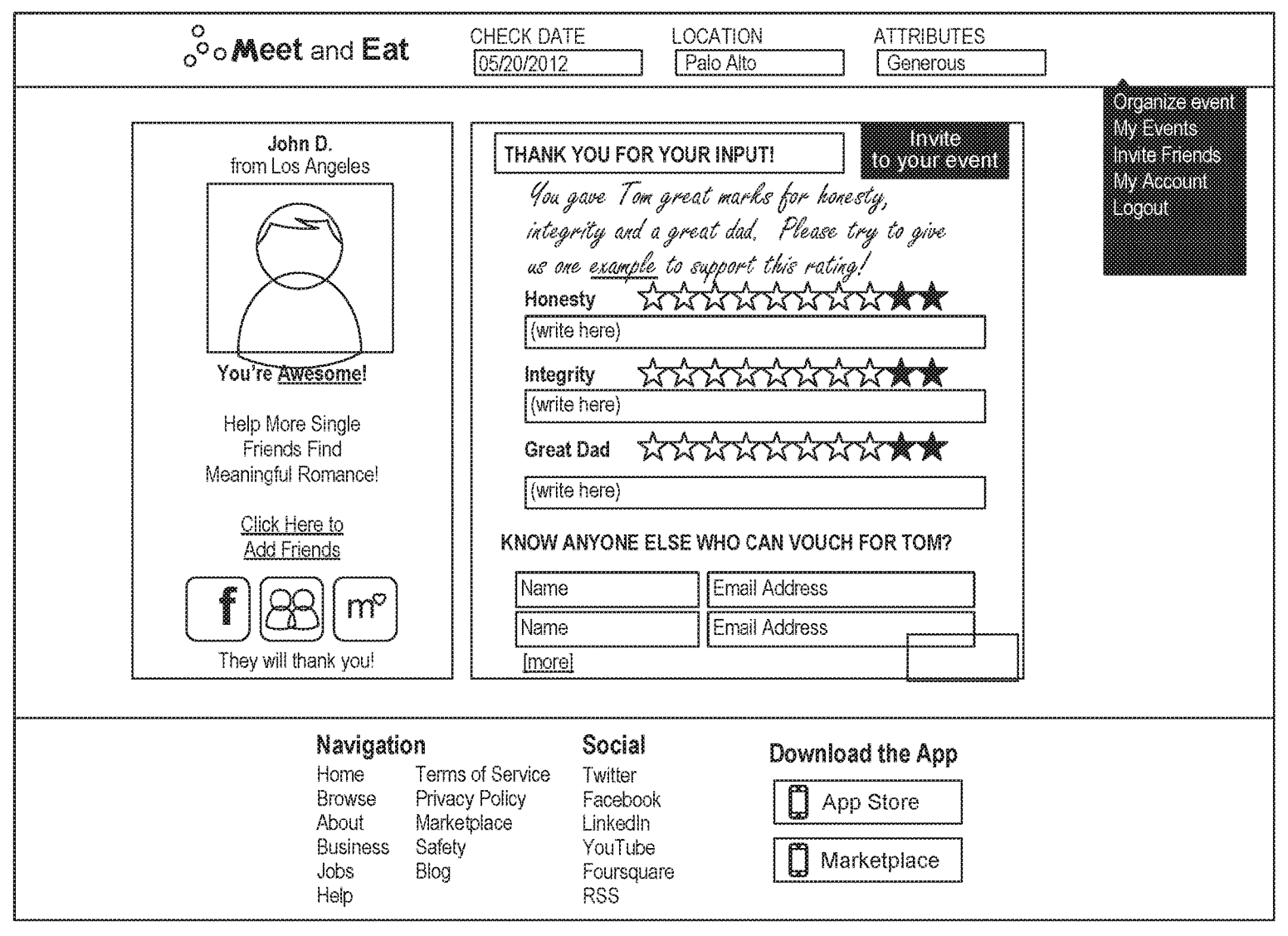

FIG. 7 illustrates an embodiment of the user profile graphic user interface. A user can act as a matchmaker and create a dating event. The user can invite other users to the dating event. In some embodiments potential couples are automatically invited to events for which they fit the criteria (age, location, profession). The user can add friends to the event. In some embodiments the user can add friends to the event and answer questions about the friends as demonstrated in FIG. 7.

Figure 8:
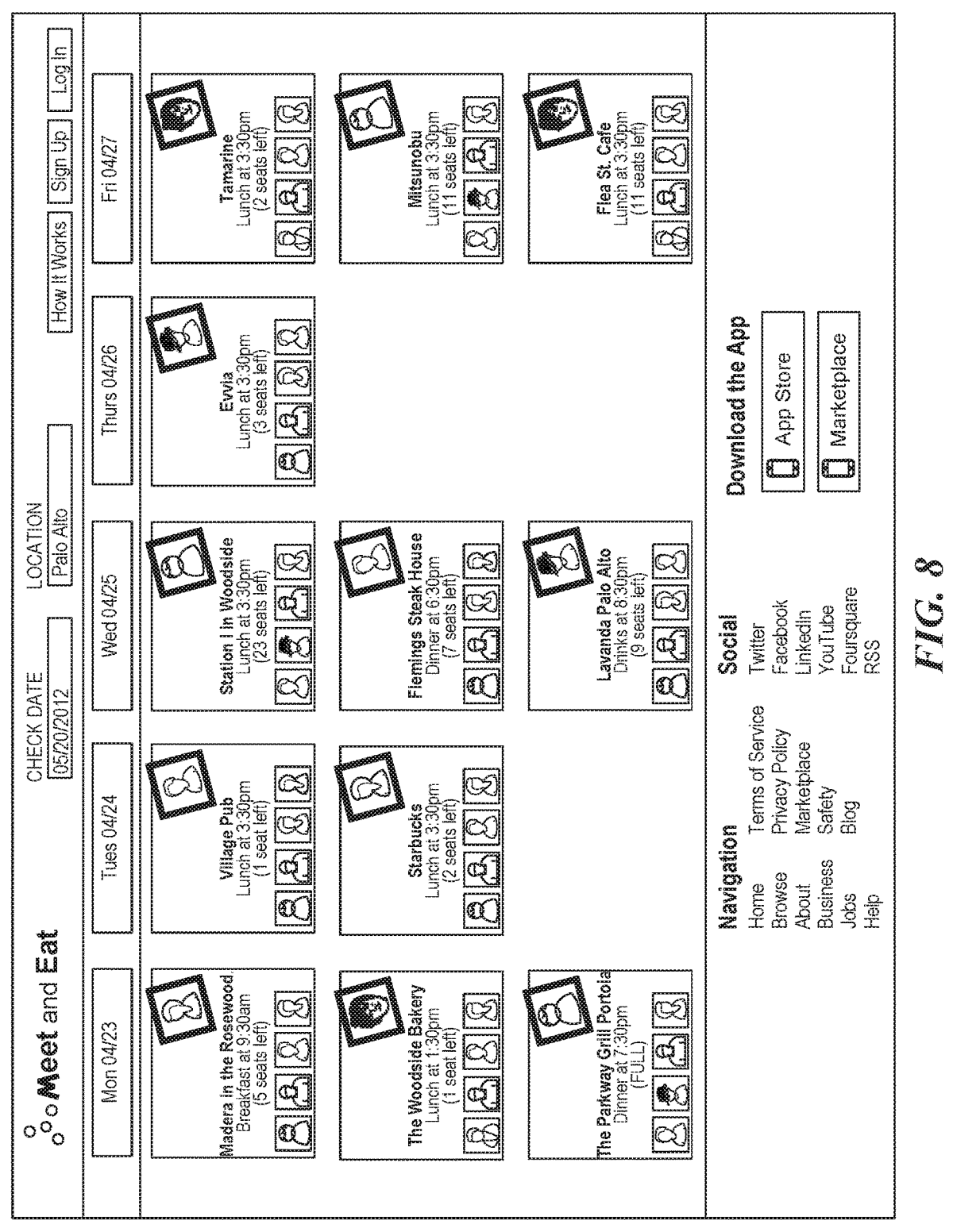

FIG. 8 illustrates a view of an event calendar. In some embodiments only matchmakers are able to view the event calendar. In other embodiments, the users can view the calendar. In other embodiments, the user can request access to the dating events. In at least one embodiment, the creator of the event is able to accept and/or deny requests.

FIG. 9 demonstrates that the computer system includes a processor, memory, non-volatile memory, and an interface device that can perform the techniques disclosed herein. Various common components (e.g., cache memory) are omitted for illustrative simplicity. The computer system can be of any applicable known or convenient type. The components of the computer system can be coupled together via a bus or through some other known or convenient device.

In some embodiments, the techniques disclosed herein can be implemented upon a mobile device. For example, a user can have a character trait personality profile generated in accordance with the techniques described herein. If that user is within a location, other users within the same location can be identified as potential matches using similar techniques as described herein. For example, if other users are within a geographical range from the user (e.g., within one hundred feet), then other users with their mobile devices with their own character trait personality profiles can be identified as potential matches using similar techniques as described herein. Thus, a type of gamification can be provided to users. The character trait personality profile can also indicate whether the user is open to be approached. If the user is open to be approached, then the user can be offered as a potential match. In one example, a first user can receive an alert on a mobile device that provides a profile of a second user that is within range who is open to being approached. The second user can then receive an alert on their mobile device that the first user is approaching.

In some embodiments, a user can be asked whether they are looking for a one-on-one date, a group date, or whether they are looking for someone to take to an event (e.g., a professional networking event, a wedding, etc.). Based on the user's response, different choices can be provided.

In some embodiments, a user can provide information regarding previous people that the user has dated in the past. These other relationships or dates can be considered to be relatively successful by the user and, therefore, similar matches can be provided.

This disclosure contemplates the computer system taking any suitable physical form. As an example, and not by way of limitation, the computer system may be an embedded computer system, a system-on-chip (SOC) system, a single-board computer (SBC) system (e.g., a computer-on-module (COM) or system-on-module (SOM) system), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer systems may include one or more computer systems; be unitary or distributed; span multiple locations; span multiple machines; or reside in a cloud, which may include one or more cloud components in one or more networks. Where appropriate, one or more computer systems may perform, without substantial spatial or temporal limitation, one or more steps of one or more methods described or illustrated herein. As an example, and not by way of limitation, one or more computer systems may perform, in real time or in batch mode, one or more steps of one or more methods described or illustrated herein. One or more computer systems may perform, at different times or at different locations, one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM) such as a CD-ROM, EPROM, or EEPROM, a magnetic or optical card, or another form of storage for large amounts of data. Some of this data is often written, by a direct memory access process, into memory during the execution of software in the computer. The non-volatile storage can be local, remote, or distributed. The non-volatile memory is optional, because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, it may be necessary to move the software to a computer-readable location appropriate for processing, and for illustrative purposes, that location is referred to as memory in this application. Even when software is moved to memory for execution, the processor will typically make use of hardware registers to store values associated with the software and make use of local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interfaces for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device. For simplicity, it is assumed that controllers of any devices not depicted in the example of FIG. 9 reside in the interface.

In operation, the computer system can be controlled by operating system software that includes a file management system, such as a disk operating system. One example of operating system software with associated file management system software is the family of operating systems known as Windows® from Microsoft Corporation of Redmond, Wash. and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, those skilled in the art will appreciate that throughout the description, discussions utilizing terms such as "processing" or "computing" or "calculating" or "determining" or "displaying" or "generating" or the like refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the machine operates as a standalone device or may be connected (e.g., networked) to other machines. In a networked deployment, the machine may operate in the capacity of a server or of a client machine in a client-server network environment or may operate as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" should also be taken to include any medium that is capable of storing, encoding, or carrying a set of instructions for execution by the machine and that causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine- or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device may comprise a transformation, such as a physical transformation. Rather, the foregoing are intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

In addition to the above-mentioned examples, various other modifications and alterations of the introduced technique may be made without departing from the invention. Accordingly, the above disclosure is not to be considered as limiting and the appended claims are to be interpreted as encompassing the true spirit and the entire scope of the invention.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A method comprising:
    identifying, by a processor, identification information associated with a person, the identification information representing identifying information which can be used on its own to identify the person;
    identifying electronic resources which include personal information of the person using the identification information, the electronic resources including one or more online data repositories including social media websites, the personal information including objective or subjective information regarding the person;

collecting the personal information about the person from the electronic resources identified by the identification information associated with the person;
generating a first character trait profile based on the objective or subjective information collected from the personal information received from the electronic resources;
validating, by the processor, third-party references that can provide information regarding the person, wherein the third-party references are validated with an algorithm using social-media contacts of the one or more online data repositories as indicated using social graphing;
contacting one of the third-party references to request further information regarding the person, the request for further information being a request for objective or subjective information regarding character traits of the person, wherein contacting the third-party reference includes:
    requesting third-party validation of the first character trait profile,
    receiving the third-party validation, and
    updating the first character trait profile using the third-party validation; and
    updating the first character trait profile to reflect the objective or subjective information regarding the character traits of the person; and
processing the third-party reference, the third-party validation, or the objective or subjective information with a machine learning engine to target a next third-party validation request for a next one of the third-party references.

2. The method of claim 1, comprising:
receiving a second character trait profile associated with a potential connection for the person;
determining whether a comparison between the first character trait profile and the second character trait profile satisfies a threshold criterion for a degree of connection;
in response to the determination that the first character trait profile and the second character trait profile satisfy the threshold criterion for a degree of compatibility, identifying an introduction setting indicative of how the person and the potential connection should be introduced to each other; and
providing the introduction setting and the second character trait profile of the potential connection to the person.

3. The method of claim 2, comprising:
receiving a feedback response representing an accuracy of the threshold criterion for the degree of connection, the feedback response indicative of how a meeting between the person and the potential connection was evaluated by the person; and
updating the threshold criterion based on the feedback response.

4. The method of claim 3, wherein the first character trait profile includes the person's preferences for character traits of the potential connection.

5. The method of claim 4, comprising:
receiving a match maker profile including a plurality of vendors each having an introduction setting representing a type of venue, and each associated with referral fees.

6. The method of claim 5, wherein identifying the introduction setting includes suggesting a vendor based on the match maker profile, the first character trait profile, and the second character trait profile.

7. A system comprising:
a processor; and
a memory storing instructions, execution of which by the processor causes the system to:
identify identification information associated with a person, the identification information representing identifying information which can be used on its own to identify the person;
identify electronic resources which include personal information of the person using the identification information, the electronic resources including one or more social media websites, the personal information including objective or subjective information regarding the person;
generate a first character trait profile based on the objective or subjective information collected from the personal information received from the electronic resources;
validate third-party references that can provide information regarding the person, wherein the third-party references are validated with an algorithm using social-media contacts of the one or more social media websites as indicated using social graphing;
contact one of the third-party references to request further information regarding the person, the request for further information being a request for the objective or subjective information regarding character traits of the person, wherein contacting the third-party reference includes:
requesting third-party validation of the first character trait profile,
receiving the third-party validation, and
updating the first character trait profile using the third-party validation; and
update the first character trait profile to reflect the objective or subjective information regarding the character traits of the person; and
process the third-party reference, the third-party validation, or the objective or subjective information with a machine learning engine to target a next third-party validation request for a next one of the third-party references.

8. The system of claim 7, wherein the memory includes further instructions execution of which by the processor causes the system to:
receive a second character trait profile associated with a potential connection for the person;
determine whether a comparison between the first character trait profile and the second character trait profile satisfies a threshold criterion for a degree of connection;
in response to the determination that the first character trait profile and the second character trait profile satisfy the threshold criterion for the degree of connection, identifying an introduction setting indicative of how the person and the potential connection should be introduced to each other; and
provide the introduction setting and the second character trait profile of the potential connection to the person.

9. The system of claim 8, wherein the memory includes further instructions execution of which by the processor causes the system to:
receive a feedback response representing an accuracy of the threshold criterion for the degree of connection, the feedback response indicative of how a meeting between the person and the potential connection was evaluated by the person; and update the threshold criterion based on the feedback response.

10. The system of claim 9, wherein the first character trait profile includes the person's preferences for character traits of the potential connection.

11. The system of claim 10, wherein the memory includes further instructions execution of which by the processor causes the system to:
receive a match maker profile including a plurality of vendors each having an introduction setting representing a type of venue, and each associated with referral fees.

12. The system of claim 11, wherein identifying the introduction setting includes suggesting a vendor based on the match maker profile, the first character trait profile, and the second character trait profile.

13. A computer program product including non-transitory computer-readable media storing computer program instructions, execution of which by a processor causes a processing system to perform operations comprising:
identify identification information associated with a person, the identification information representing identifying information which can be used on its own to identify the person;
identify electronic resources which include personal information of the person using the identification information, the electronic resources including one or more social media websites, the personal information including objective or subjective information regarding the person;
generate a first character trait profile based on the objective or subjective information collected from the personal information received from the electronic resources;
validate third-party references that can provide information regarding the person, wherein the third-party references are validated with an algorithm using social-media contacts of the one or more social media websites as indicated using social graphing;
contact one of the third-party references to request further information regarding the person, the request for further information being a request for objective or subjective information regarding character traits of the person, wherein contacting the third-party reference includes:
requesting third-party validation of the first character trait profile,
receiving the third-party validation, and
updating the first character trait profile using the third-party validation; and
update the first character trait profile to reflect the objective or subjective information regarding the character traits of the person; and
process the third-party reference, the third-party validation, or the objective or subjective information with a machine learning engine to target a next third-party validation request for a next one of the third-party references.

14. The computer program product of claim 13, comprising:
receiving a second character trait profile associated with a potential connection for the person;
determining whether a comparison between the first character trait profile and the second character trait profile satisfies a threshold criterion for a degree of connection;
in response to the determination that the first character trait profile and the second character trait profile satisfy the threshold criterion for the degree of connection, identifying an introduction setting indicative of how the person and the potential connection should be introduced to each other; and
providing the introduction setting and the second character trait profile of the potential connection to the person.

15. The computer program product of claim 14, comprising:
receiving a feedback response representing an accuracy of the threshold criterion for the degree of connection, the feedback response indicative of how a meeting between the person and the potential connection was evaluated by the person; and
updating the threshold criterion based on the feedback response.

16. The computer program product of claim 15, wherein the first character trait profile includes the person's preferences for character traits of the potential connection.

17. The computer program product of claim 16, comprising:
receiving a match maker profile including a plurality of vendors each having an introduction setting representing a type of venue, and each associated with referral fees.

18. The computer program product of claim 17, wherein identifying the introduction setting includes suggesting a vendor based on the match maker profile, the first character trait profile, and the second character trait profile.

* * * * *